W. J. PARKINSON, W. A. M. WELLES AND P. W. TIERNEY.
FILM WINDING DEVICE.
APPLICATION FILED MAY 5, 1917.
1,308,991.
Patented July 8, 1919.
6 SHEETS—SHEET 3.
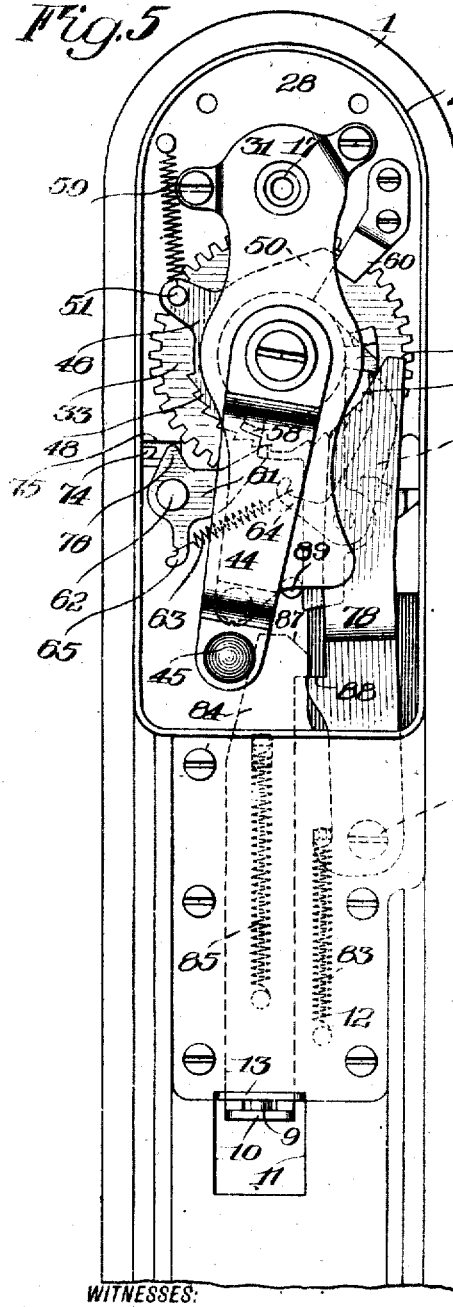
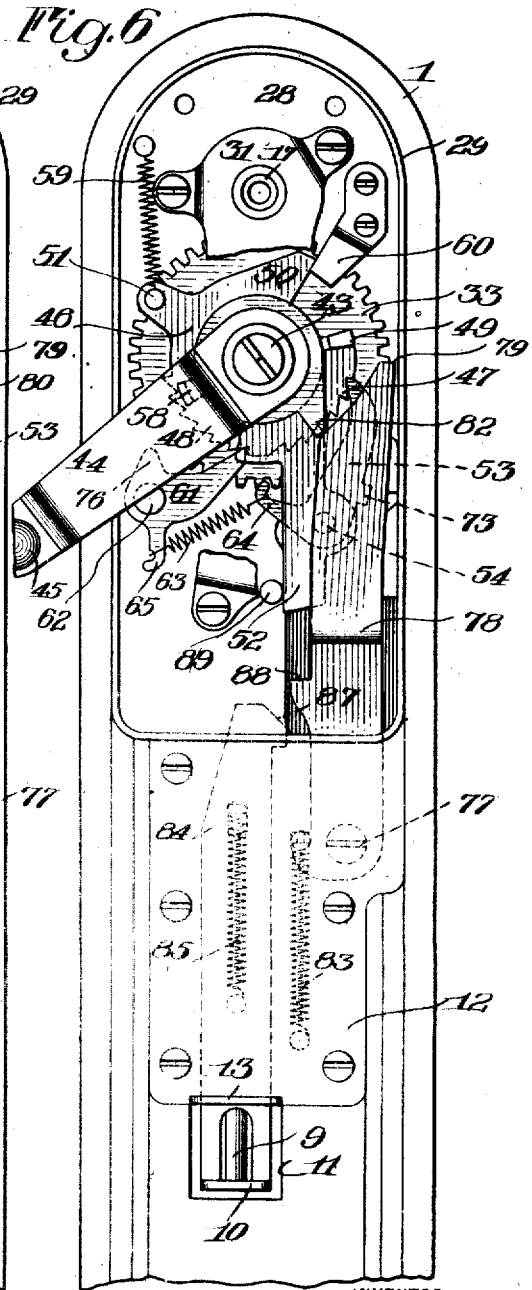
WITNESSES:
Nelson H. Copp
INVENTORS
William J. Parkinson
William A. M. Welles
Philip W. Tierney
BY
their ATTORNEYS

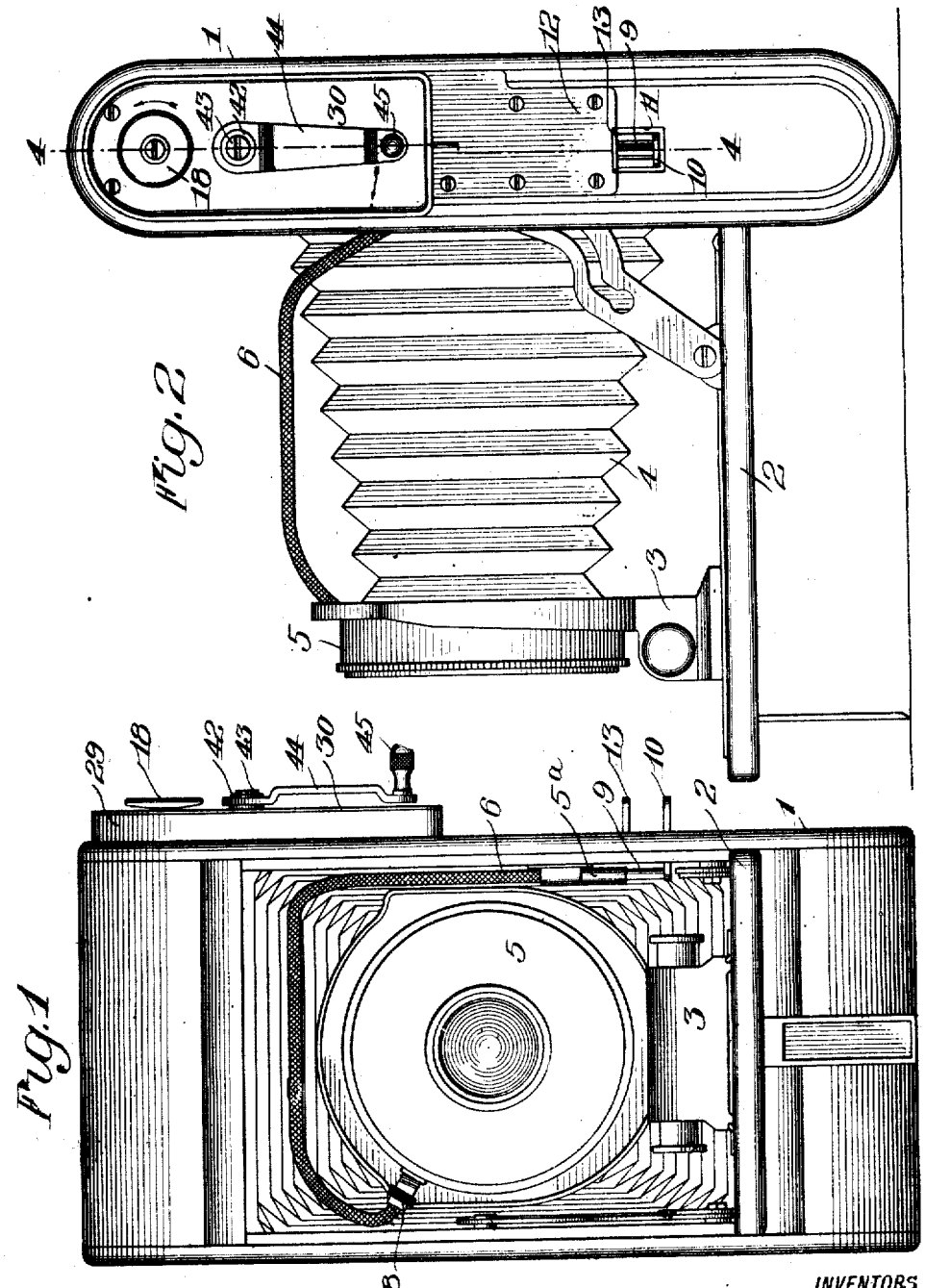

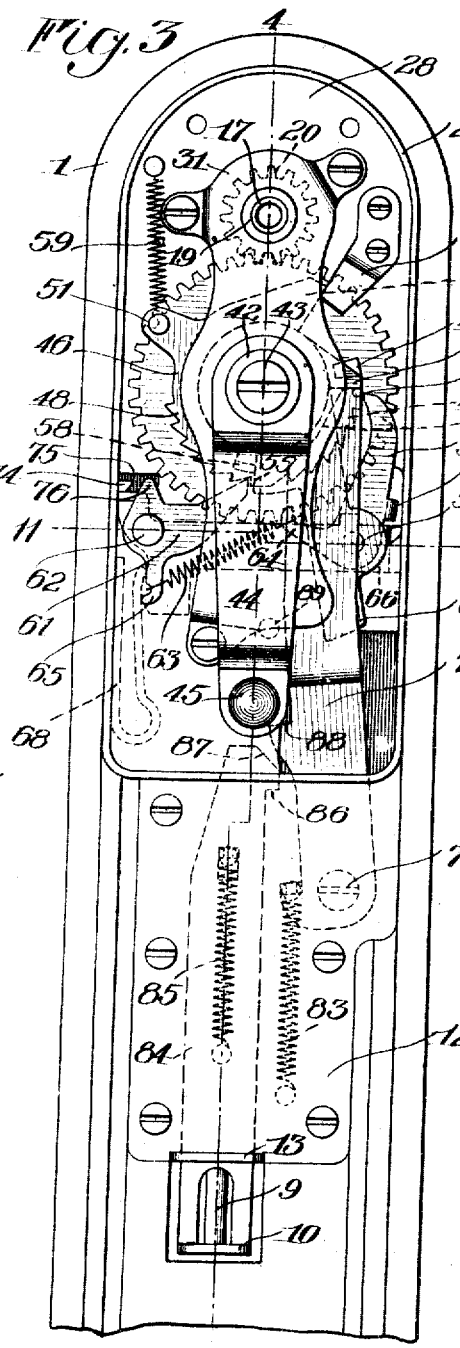

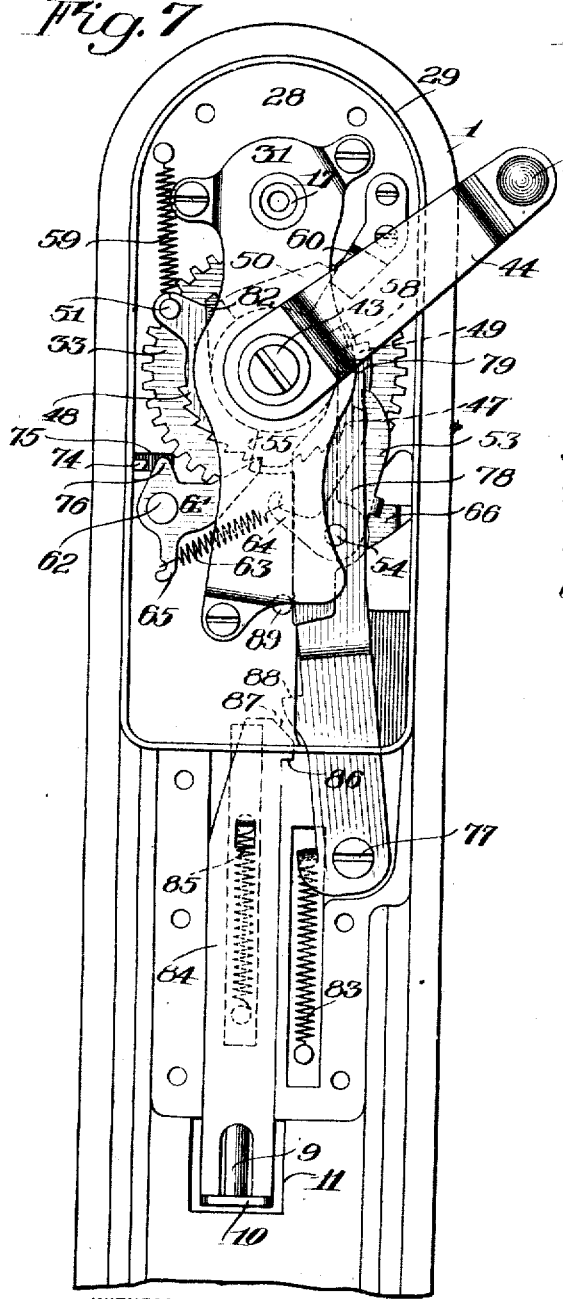

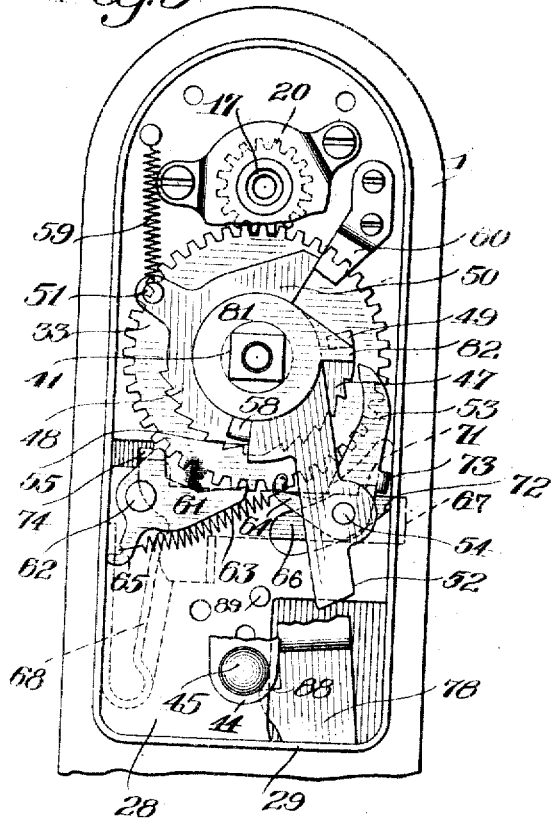
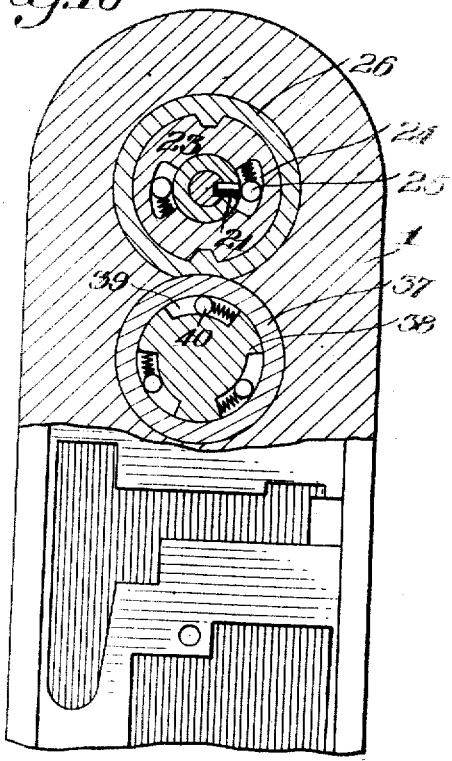
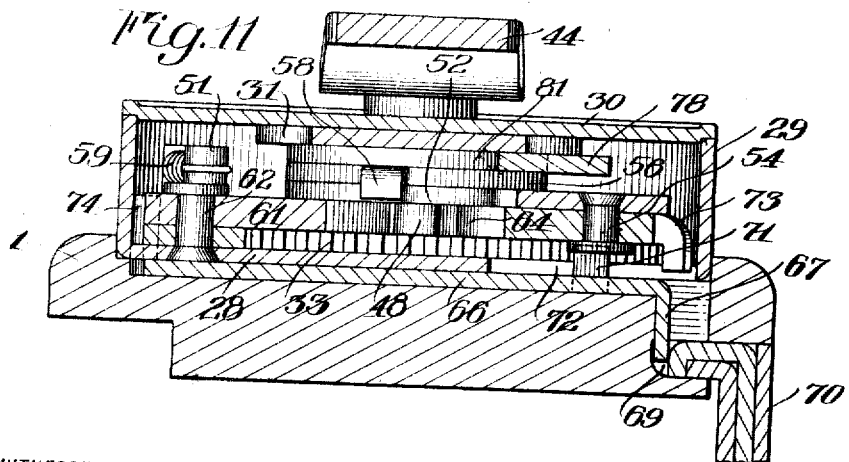

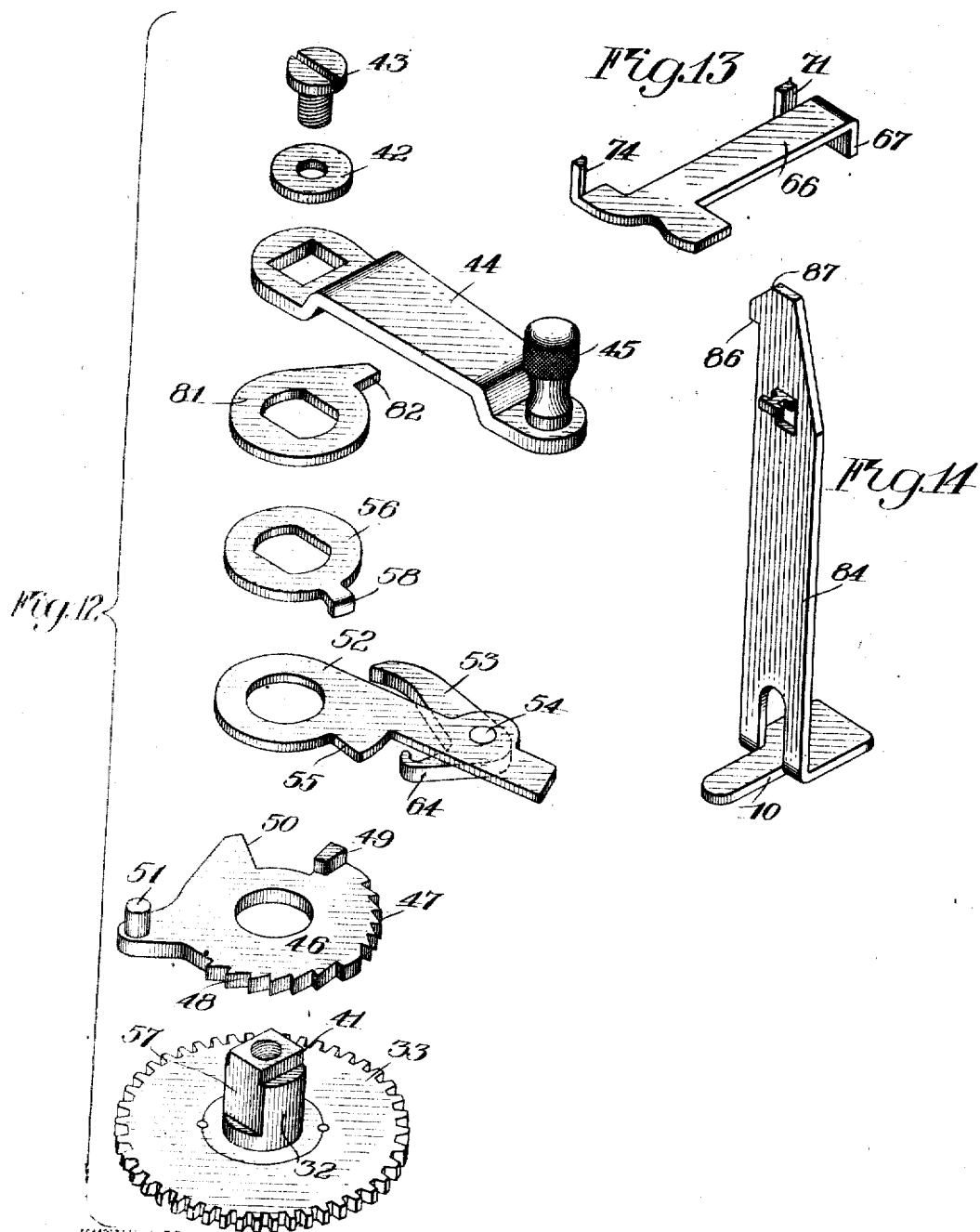

UNITED STATES PATENT OFFICE.

WILLIAM J. PARKINSON, WILLIAM A. M. WELLES, AND PHILIP W. TIERNEY, OF ROCHESTER, NEW YORK, ASSIGNORS TO EASTMAN KODAK COMPANY, OF ROCHESTER, NEW YORK, A CORPORATION OF NEW YORK.

FILM-WINDING DEVICE.

1,308,991.     Specification of Letters Patent.     Patented July 8, 1919.

Application filed May 5, 1917. Serial No. 166,540.

*To all whom it may concern:*

Be it known that we, WILLIAM J. PARKINSON, WILLIAM A. M. WELLES, and PHILIP W. TIERNEY, of Rochester, in the county of Monroe and State of New York, have invented certain new and useful Improvements in Film-Winding Devices; and we do hereby declare the following to be a full, clear, and exact description of the same, reference being had to the accompanying drawing, forming a part of this specification, and to the reference-numerals marked thereon.

Our present invention relates to photography and more particularly to photographic cameras or roll holders for exposing photographic film and it has for its object to provide an improved mechanism whereby the successive lengths of film to be exposed may be quickly and accurately drawn into the field of exposure. Another object of the invention is to combine such mechanism in a simple manner with the shutter mechanism to the end that a check may be placed upon the operator preventing him from doubling the exposure upon a single picture area through failure to wind a new length of film into position between actuations of the shutter and from winding off film in position for exposure before the shutter has been operated to expose it. The invention contemplates reeling up the film in the usual general manner and the improvements are directed in part toward the means whereby compensation is made for the constant increase in the diameter of the winding roll to cause it to draw up the same length of film each time. To these and other ends the invention resides in certain improvements and combinations of parts all as will be hereinafter more fully described, the novel features being pointed out in the claims at the end of the specification.

In the drawings:

Figure 1 is a front elevation of a folding camera constructed in accordance with and illustrating one embodiment of our invention;

Fig. 2 is a side view thereof;

Fig. 3 is an enlarged elevation of the film winding mechanism with the cover plate shown in Fig. 2 removed and with the parts in the position they occupy immediately after the camera has been loaded with film and closed;

Fig. 4 is an enlarged section taken substantially on the line 4—4 of Fig. 3 and also the line 4—4 of Fig. 2;

Fig. 5 is a view similar to Fig. 3 after the shutter has been operated the first time;

Fig. 6 is a similar view showing the position of the parts during the winding of the film;

Fig. 7 is a similar view showing the parts as they appear at the end of the winding stroke;

Fig. 8 is a similar view showing the return of the driving member after the fifth exposure;

Fig. 9 is a similar view showing the winding mechanism partially set with various parts broken away or removed;

Fig. 10 is a fragmentary section on the line 10—10 of Fig. 4;

Fig. 11 is an enlarged section on the line 11—11 of Fig. 3;

Fig. 12 is a collective view showing in perspective and in the order of their assembly the various parts carried on the shaft of the driving member, and Figs. 13 and 14 are detail perspective views of certain other parts.

Similar reference numerals throughout the several views indicate the same parts.

The camera shown comprises the usual flat body 1 having a hinged door and bed 2 on which is projected a front 3 connected to the body by a bellows 4. The front and bellows fold into the body as usual and the front carries a shutter 5 that moves into the body with it. On the inside of a side wall of the body 1 is secured a socket 5$^a$ that holds the inner end of the flexible casing 6 (Fig. 4) of the well known cable release, the outer end of which is connected to the shutter at 8 (Fig. 1). The inner cable or thrust member 7 of the release that trips the shutter terminates in a push rod 9 projecting from the lower end of the socket 5$^a$ and carrying a finger portion or operating member 10 that extends through an opening 11 in the body wall to be accessible from the exterior of the camera. On the exterior of the camera is a plate 12 having a fixed flange 13 forming a finger portion adjacent to the finger portion 10. When the operator presses the finger portion 10 against the finger portion 11 by pinching the two together, the shutter is operated.

At one end of the body (Fig. 4) is a film winding chamber 14 containing a spool or reel 15 upon which the film is to be wound in the usual manner after being drawn across the exposure opening. The spool is turned by a head 16 (shown in dotted lines in engagement with its slotted end) on a longitudinally slidable stem 17 terminating in a button 18 on the exterior of the camera. A spring 18ª holds the stem in engagement with the spool but by means of the button, the stem may be retracted to release the spool. The stem slides in the hub 19 of a small gear 20 and is locked for rotation with the hub by a pin 21 (Figs. 4 and 10) on the latter that works in a groove or keyway 22 in the stem. The hub turns in the winding direction only in a clutch block 23 having the usual recesses 24 confining spring pressed rollers 25 in engagement with the periphery of the hub to prevent back winding. The clutch block 23 is carried by a socket 26 in which it is locked against rotation and both of these parts are confined between an inner washer 27 and the bottom 28 of a gear casing 29 on the outside of the body 1. The latter is recessed as shown to accommodate these parts. The hub 19 extends through a cover plate 30 of the casing 29 and is journaled therein and in a frame plate 31 just beneath it.

Adjacent to the hub 19 is the shaft 32 of a driving member for intermittently turning it and the stem 17 in the winding direction. Motion is communicated from it to the hub through a large gear 33 that meshes with the gear 20 on the hub but this gear 33 is not fixed on the shaft for movement in other than the one direction that will turn the reel 15 in the winding direction. The inner end of the shaft 32 is journaled at 34 in plates or washers 35 and 36. Surrounding the shaft adjacent to its bearing is a clutch socket 37 (Figs. 4 and 10). This portion of the shaft is flanged at 38 to turn in the socket and recessed at 39 to receive spring pressed clutch rollers 40 that travel on the inner periphery of the socket and lock it for rotation with the shaft when the latter is turned to the right but allow the shaft to idle therein when the said shaft is turned to the left. The large gear 33 is fixed to this socket 37. On the outer end of the shaft which is squared at 41 is secured by a washer 42 and screw 43 a crank 44 having a handle 45.

It will be seen from the above that when the crank 44 is turned to the right in Fig. 3, the clutch rollers 40 will lock the socket 37 and gear 33 thereto and turn the hub 19 and reel 15 to the left which is the winding direction permitted by the other clutch rollers 25. When the crank 44 is brought back, however, the clutch rollers 25 will prevent the reel from turning in the reverse direction and the shaft 32 will turn idly in the clutch socket 37 which is locked against reverse movement because fixed to the gear 33 that is locked with the gear 20. This mechanism therefore furnishes a means for intermittently turning the winding reel in one direction only.

Of course, the throw of the lever 44 determines the extent of the winding movement of the reel 15 but as the reel increases in diameter from the accumulation thereon of successive convolutions of film, a uniform movement thereof on each actuation would draw a constantly increasing amount of film instead of the length equal to one picture area each time. We therefore arrange for automatically making each stroke of the crank 44 shorter than its predecessor so that as the film roll increases, the movement imparted to the reel decreases. This is done in the following manner:

Arranged to turn freely on the shaft 32 next above the gear 33 is a ratchet wheel 46. It is formed with a series of five teeth 47; another series of similar teeth 48 (Fig. 12); a stop 49; an abutment 50, and a pin 51. Next above the ratchet and also free to turn on the shaft is a lever or vibratory member 52 carrying a pawl 53 on its under side pivoted at 54 and formed with a stop shoulder 55. Next above the member 52 is a plate 56 that fits a squared portion 57 of the shaft and turns with it. This plate is provided with a depending stop ear 58 that is adapted to engage both the stop 49 on the ratchet and the stop shoulder 55 on the vibratory member. A spring 59 attached to the pin 51 of the ratchet 46 tends to hold the abutment 50 on the latter against a fixed stop finger 60 secured to the gear casing 29, as shown in Figs. 3, 5, 6 and 9. This represents the limit of movement of the ratchet and its stop 49 to the right and hence the limit to which the shaft 32 of the driving mechanism may turn to the right because of the engagement of the ear 58 thereon with stop 49.

The pawl 53 coöperates with the ratchet teeth 47 and is adapted to turn the ratchet to the left as the arm 52 is vibrated. The teeth 48 of the ratchet are engaged by a holding pawl 61 turning on a fixed pivot 62 in the gear casing 29. Both pawls are normally held in operative position by a spring 63, one end of which is connected to an arm 64 on the pawl 53 and the other end of which is connected to an arm 65 on the pawl 61. It is obvious that this spring will also have a tendency to move the arm 52 on which the pawl 53 is carried.

The operation of the device as so far described is as follows:

Fig. 3 shows the position of the parts with the camera loaded and ready for the winding off of the film for the first exposure.

The stop ear 58 of the driving member is in engagement with the stop shoulder 55 of the vibratory arm 52. The holding pawl 61 is in engagement with the first tooth of the ratchet series 48 while the pawl 53 rests upon a blank portion of the ratchet. As the crank 44 is turned to the right and the stop 58 moves away from the stop shoulder 55, the spring 63 carries the arm 52 against a stop pin 89 and brings the pawl 53 into the first ratchet tooth of the series 47 and when the full swing of the crank has been completed, turning the reel 15 the required number of revolutions, the stop ear 58 is halted by the stop 49 of the ratchet. The crank 44 is then brought back and halted on the return stroke by the stop shoulder 55 but not before it has vibrated the arm 52 sufficiently for the pawl 53 to advance the ratchet 46 one tooth and with it the stop 49 so that it will intercept the driving member at an earlier point on the next actuation than it did before. This movement of the arm 52 is limited by the wall of the gear casing 29 and the holding pawl 61 goes into engagement with the next tooth of the ratchet to maintain it in its new position. The stop 49 is thus progressively advanced upon each winding movement so that each time the crank 44 has a shorter throw and the reel 15 is turned to a less extent. Fig. 8 shows its most advanced position on the return stroke of the crank after the fifth exposure, the present apparatus being designed for a six exposure film.

The last exposure having been made, the ratchet and its stop 49 must be carried back to its original position and we make provision for effecting this automatically when the exposed film is removed from the camera and a fresh film inserted. To this end, a push rod 66 is suitably guided beneath the gear case 29 (Figs. 9, 11 and 13) and an end 67 thereof is pressed by a spring 68 into the groove seat 69 for the flanges of the displaceable back 70 of the camera (Figs. 4 and 11), this back being of the usual construction. When the back 70 is in position as in Figs. 3 and 11, for instance, an ear 71 on the push rod that projects through a slot 72 in the gear case 29 is thereby held out of engagement with an ear 73 on the pawl 53 and a similar ear 74 on the push rod projecting through a slot 75 is held out of engagement with an arm 76 on the holding pawl 61, the spring 68 being held compressed. When the back 70 is removed or displaced, however, and releases the end 67 of the push rod 66, the latter is actuated by spring 68 and its respective ears throw out the two pawls 53 and 61, as shown in Fig. 9. As soon as this disengagement occurs, the ratchet 46 is turned to the right by its spring 59 until the abutment 50 strikes the fixed stop 60, as shown in the same figure. The back is now applied releasing the two pawls, the new film roll having been inserted and all of the positions of Fig. 3 with which the foregoing description of operation started are resumed.

We will now describe the means through which the winding operation can be conducted only after an actuation of the shutter and the shutter can be actuated only after the film has been wound. Pivoted at 77 on a wall of the body 1 is a detent lever 78 the upper end of which is formed with a square shoulder 79 and with an adjacent cam surface 80, (Fig. 5). Carried on the shaft 32 of the driving member just below the crank 44 is a plate 81 that turns with the shaft and has a shoulder 82 thereon. When the driving member is rotated back to set position after a winding movement, the shoulder 82 is engaged by the shoulder 79 of the detent 78 which is snapped into its path by a spring 83. This locks the winding mechanism against winding movement. There is carried by the operating portion 10 of the shutter release a plate 84 that slides beneath the plate 12 and is acted upon by a spring 85 to move the shutter release to operative position with the finger pieces 10 and 12 separated. At the upper end of the plate 84 is a detent shoulder 86 with an adjacent cam surface 87 and just above this the detent lever 78 of the winding mechanism is provided with a shoulder 88. With the winding device locked as in Fig. 3, the shutter should be actuated before further winding movement is attempted. When so actuated in the manner previously explained, the cam surface 87 on the detent plate 84 displaces the winding detent 78 and frees the winding mechanism but in doing so, its shoulder 86 hooks over the shoulder 88 on the detent 78, as shown in Fig. 5, and prevents the shutter operating portion 10 and connected parts from returning ready for another actuation of the shutter. This detention of the shutter is in turn released by the operation of the winding mechanism for as the projection 82 on the driving shaft progresses during the winding movement, it engages the cam surface 80 of the pivoted detent 78 and displaces the latter sufficiently to free the shoulder 88 thereof from the shoulder 86 of the shutter detent 84, allowing the latter to return under the influence of its spring 85 to operative position, all as shown in Fig. 6.

Note is made of the fact that it is the locking of the driving member on the detent 78 that holds the pawl 53 momentarily in the position of Fig. 3 before it engages the first tooth, or rather, that prevents the pawl spring 63 from moving the arm 52 and with it the crank 44 sufficiently to allow the pawl to engage. As soon as the winding movement starts, there is a brief movement of this kind that engages the pawl 53 in the first tooth and which is limited by the engagement of the arm 52 with a fixed pin 89, as in Fig. 5.

We claim as our invention:

1. In a film feeding device for photographic roll holders, the combination with a winding reel, a rotary driving member therefor and a rotary element carrying a stop for the driving member and movable concentrically therewith, of means actuated by the driving member when moved in one direction for advancing the stop to limit its movement in the other direction.

2. In a film feeding device for photographic roll holders, the combination with a winding reel, a rotary driving member therefor and a ratchet wheel carrying a stop for the driving member and movable concentrically therewith, of a vibratory member actuated by the driving member when moved in one direction and a pawl thereon engaging the ratchet to advance the stop and limit the movement of the driving member in the other direction.

3. In a film feeding device for photographic roll holders, the combination with a winding reel, of a shaft, a member thereon for turning the reel intermittently in one direction, a ratchet wheel fixed on the shaft and having a stop thereon for limiting the winding movement of the shaft, a vibratory member free on the shaft and carrying a pawl, and a stop fixed on the shaft to engage the ratchet stop when moved in one direction and to engage the vibratory member and advance the ratchet through the medium of the pawl when moved in the other direction.

4. In a feeding device for photographic roll holders, the combination with a winding reel, and a rotary driving member adapted to turn the reel intermittently in one direction, of a ratchet having a stop thereon for limiting the winding movement of the driving member and also an abutment thereon, a vibratory member adapted to limit the return movement of the driving member and carrying a pawl actuated by the latter to advance the ratchet and stop, a fixed stop for limiting the resetting movement of the ratchet through contact with the abutment on the latter, a spring for resetting the ratchet and means for releasing the pawl.

5. In a film feeding device for photographic roll holders, the combination with a winding reel and a driving member for turning the reel intermittently in one direction, of a stop for limiting the winding movement of the driving member, means including a ratchet and pawl actuated by the return stroke of the driving member for advancing the stop in the path of the latter, a holding pawl for the ratchet and a spring connected at one end to one pawl and at the other end to the other for moving both pawls into engaging position.

6. In a film feeding device for photographic roll holders, the combination with a winding reel, and a driving member for turning the reel intermittently in one direction, of a stop for limiting the winding movement of the driving member, means actuated by the return of the driving member for advancing the stop progressively, a holding means for locking the stop after each advance, a releasing member common to both of said means, and means for returning the stop to initial set position.

7. In a film winding device for photographic roll holders, the combination with a casing having film chambers, a displaceable cover therefor, a winding reel, and a driving member for turning the reel intermittently in one direction, of means controlling the action of the driving member upon the reel and a device for releasing the controlling means actuated by the displaceable cover.

8. In a film winding device for photographic roll holders, the combination with a casing having film chambers, a displaceable cover therefor, a winding reel, and a driving member for turning the reel intermittently in one direction, of a stop for limiting the winding movement of the driving member, means for advancing the stop progressively upon each winding operation, a holding means for locking the stop after each advance, a releasing device common to both of said means and adapted to be actuated by the displaceable cover and means for returning the stop.

9. In a film winding device for photographic roll holders, the combination with a casing having film chambers, a winding reel and a driving member for turning the reel intermittently in one direction, of a stop for limiting the winding movement of the driving member, means for advancing the stop progressively upon each winding operation, a holding means for locking the stop after each advance, a releasing device common to both of said means, means for returning the stop and a displaceable cover for the film chambers operating upon the releasing device to automatically disengage the advancing and holding means when the cover is open and to engage them when the cover is closed.

WILLIAM J. PARKINSON.
WILLIAM A. M. WELLES.
PHILIP W. TIERNEY.

Witnesses:
HOWARD C. WELLMAN,
MAXWELL H. HILL.